(12) United States Patent
Esslinger

(10) Patent No.: US 7,984,560 B2
(45) Date of Patent: Jul. 26, 2011

(54) MINIMUM CLEARANCE BORE GAUGE

(75) Inventor: Thomas Esslinger, Langdon, NH (US)

(73) Assignee: Bore Repair Systems, Inc., Alstead, NH (US)

( * ) Notice: Subject to any disclaimer, the term of this patent is extended or adjusted under 35 U.S.C. 154(b) by 0 days.

(21) Appl. No.: 12/370,147

(22) Filed: Feb. 12, 2009

(65) Prior Publication Data
US 2009/0205215 A1 Aug. 20, 2009

Related U.S. Application Data

(60) Provisional application No. 61/029,044, filed on Feb. 15, 2008.

(51) Int. Cl.
G01B 5/12 (2006.01)
G01B 5/14 (2006.01)
(52) U.S. Cl. ......................................... 33/542.1; 33/542
(58) Field of Classification Search ................ 33/542.1, 33/542, 544, 544.2, 544.3
See application file for complete search history.

(56) References Cited

U.S. PATENT DOCUMENTS

| 1,431,612 | A | * | 10/1922 | Wittner | 33/542.1 |
| 1,789,020 | A | * | 1/1931 | Parker | 33/542.1 |
| 2,431,717 | A | * | 12/1947 | Watson | 33/542.1 |
| 2,596,204 | A | * | 5/1952 | Bryson | 33/542 |
| 2,877,558 | A | * | 3/1959 | Gaxiola | 33/542.1 |
| 3,015,891 | A | * | 1/1962 | Larson | 33/542 |
| 3,321,839 | A | * | 5/1967 | Muller | 33/560 |
| 3,921,300 | A | * | 11/1975 | Cox et al. | 33/702 |
| 4,030,202 | A | * | 6/1977 | Fadl et al. | 33/542 |
| 7,262,593 | B2 | * | 8/2007 | Knabel | 324/207.24 |
| 2002/0166251 | A1 | * | 11/2002 | Jones | 33/542 |

OTHER PUBLICATIONS

B&D Manufacturing Web page, Date Unknown.*

* cited by examiner

Primary Examiner — Christopher W Fulton
(74) Attorney, Agent, or Firm — Davis & Bujold, P.L.L.C.

(57) ABSTRACT

A method of measuring an interior diameter of a bore with an expandible gauge having relatively movable first and second components and placing an adhesive on at least one of the first and the second components for adhesively bonding the first and the second components to one another. Inserting the expandible gauge into a tool hole in a bore bar and sliding the bore bar into the bore so that the tool hole is located within the bore. Allowing the expandible gauge to expand to a diameter of a bore to be measured and adhesively bond the first and the second components to one another. Removing the expandible gauge and determining the diameter of the bore by measuring a length of the expandible gauge.

17 Claims, 3 Drawing Sheets

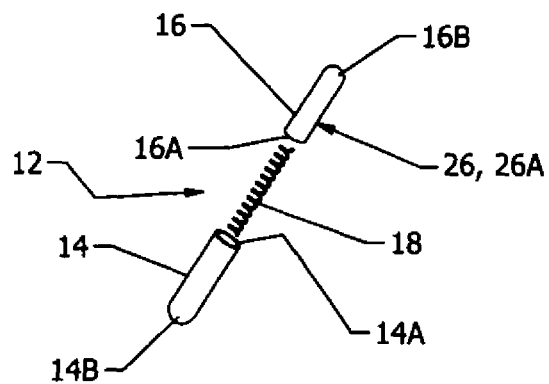
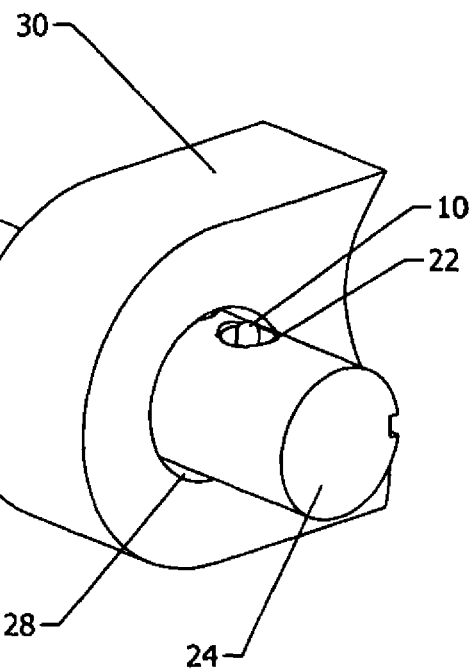
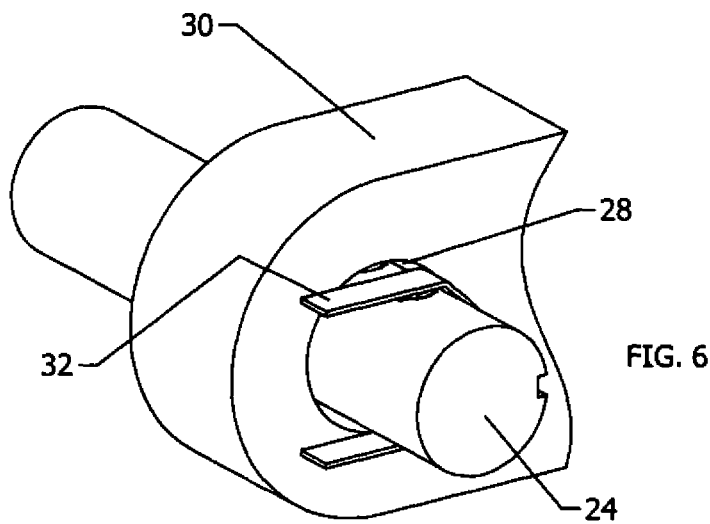

MINIMUM CLEARANCE BORE GAUGE

FIELD OF THE INVENTION

The present invention relates to a bore gauge for measuring the interior diameter of a bore, for example, during machining of a bore in large equipment by means of a portable boring machine, and, in particular, for measuring a bore with minimum clearance between the walls of the bore and a boring bar.

BACKGROUND OF THE INVENTION

Heavy equipment and machinery frequently require repair and it is generally preferable that such repair be done in the field rather than transporting the machinery or equipment to a suitable repair facility as this reduces the associated time and costs required for repair. One of the most commonly required repairs for large machinery or equipment is the repair of a bore, that is, a circular opening that supports an axle or shaft, for example, and this circular opening becomes damaged or excessively worn due to a variety of different reasons or causes. Alternatively, a bore can be bored out to a slightly larger for a variety of different reasons.

The repair of a damaged or worn bore typically involves rebuilding the interior surface of the bore by the deposition of a metal, typically by a welding or a flame deposition process, and the subsequent boring and machining of the rebuilt or refabricated bore to the a precisely required diameter. These operations are typically performed in the field by means of a portable boring machine which has a boring bar that is inserted into the bore. The boring bar is typically supported on bearings on each side of the bore and may be fitted with a variety of tools for repairing the bore, such as a welding head and a variety of cutting or machining tools.

This arrangement, that is, of a boring bar bearing one or more bore repair tools and supported at each end of the bore by bearings, provides the radial support and rigidity for the tools that is necessary for the accurate reconstruction of a bore, but also presents other problems and shortcomings. For example, and in particular, the accurate reconstruction of a bore requires the periodic measurement of the interior diameter of the bore at various points in the reconstruction process to ensure an accurate rebuilt or refabrication of the bore.

While it is obviously possible to insert any of a number of interior bore measuring devices into a bore, such as interior calipers or an expandable micrometer, it is preferable that the measurements be made without removing the bore bar from the bore as this essentially requires disassembly, or at least dismounting, of a portion of the boring machine, such as the bearings. This, in turn, significantly increases the time required to complete the repair procedure and the probability that errors and inaccuracies will be introduced when reassembling and remounting the bore bar and bearings and/or readjusting the bore bar tool.

The most accurate and cost effective of the previously available bore measurement devices are, therefore, those which are inserted into a tool hole extending across a diameter of the bore bar and which include a mechanism by which the length of a measuring device can be expanded into contact with the interior surface of the bore at a pair of diametrically opposed points. The diameter of the bore can then be determined by withdrawing the bore bar sufficiently from the bore for the measuring device to be removed from the tool hole and measuring the expanded device or reading the diameter from a measurement scale on the device.

However, this type of device is not free of problems because it is necessary to insert an adjustment tool into the bore to expand and lock the measuring device. This requires the adjustment tool to fit between the outside diameter of the bore bar and the inside diameter of the bore, and to be able to operate and function in this space. There is often insufficient space to fit the adjustment tool between the bore bar and the interior of the bore, particularly since it is preferable to use the largest diameter bore bar that will fit into the bore in order to provide the maximum possible radial support and rigidity for the bore bar and tools. This problem may be overcome, for example, by reducing the diameter of the bore bar, but this reduces the radial support and rigidity of the bore bar and tools, thereby increasing the possibility of an error in the diameter or shape of the bore and increasing the time required for the cutting or machining operations. It will also be recognized that this problem cannot be overcome by using a larger diameter bore bar for reconstruction operations and a smaller diameter bore bar for the measurements as this would again require removal of the bore bar and bearings, leading to the same problems as discussed above.

The present invention provides a solution to these and related problems of the prior art.

SUMMARY OF THE INVENTION

Wherefore, it is an object of the present invention to overcome the above mentioned shortcomings and drawbacks associated with the prior art.

Another object of the present invention is to provide an inexpensive but reliable device, e.g., an expandible gauge, for accurately measuring the inside diameter of a bore being repaired.

Yet another object of the present invention is to provide a procedure which avoids disassembling the bore bar to thereby reduce the time required to obtain a measurement of a bore and thus reduce the time required to complete the repair procedure for the bore being repaired.

The present invention relates to a method of measuring an interior diameter of a bore, the method comprising the steps of: providing an expandible gauge having relatively movable first and second components; placing an adhesive on at least one of the first and the second components such that the adhesive can temporarily bond the first and the second components to one another; inserting the expandible gauge into a tool hole in a bore bar; sliding the bore bar into the bore so that the tool hole and the expandible gauge are located within the bore; allowing the expandible gauge to expand to a diameter of a bore to be measured; allowing the adhesive to bond the first and the second components of the expandible gauge to one another; and removing the expandible gauge and determining the diameter of the bore by measuring a length of the expandible gauge.

The present invention also relates to a method of measuring an interior diameter of a bore, the method comprising the steps of: placing a predetermined quantity of an adhesive on a first component of an expandible gauge at a location that will overlap with a second component of the expandible gauge when outer ends of the first and the second components of the expandible gauge are moved apart by a distance corresponding to a diameter of a bore to be measured; inserting the expandible gauge into a tool hole in a bore bar; sliding the bore bar into the bore so that the tool hole and the expandible gauge are located within the bore; allowing the expandible gauge to expand so that the outer ends of the first and the second components of the expandible gauge are moved apart by a distance corresponding to a diameter of a bore to be measured; allowing the adhesive to bond the first and the second components of the expandible gauge to one another;

sliding the bore bar out of the bore until the expandible gauge can be removed from the tool hole, and determining the diameter of the bore by measuring the distance between the outer ends of the first and the second components of the expandible gauge.

BRIEF DESCRIPTION OF THE DRAWINGS

The present invention will now be described by way of example with reference to the accompanying drawings, in which:

FIG. 1 is a diagrammatic representation of an expandible gauge of a minimum clearance bore gauge;

FIGS. 3 and 4 are illustrations showing insertion of the assembled bore bar with the minimum bore gauge into a bore;

FIG. 6 is an illustration showing use of an expandible gauge retainer clip to restrain premature expansion of the expandible gauge.

DETAILED DESCRIPTION OF THE INVENTION

Figure 5:
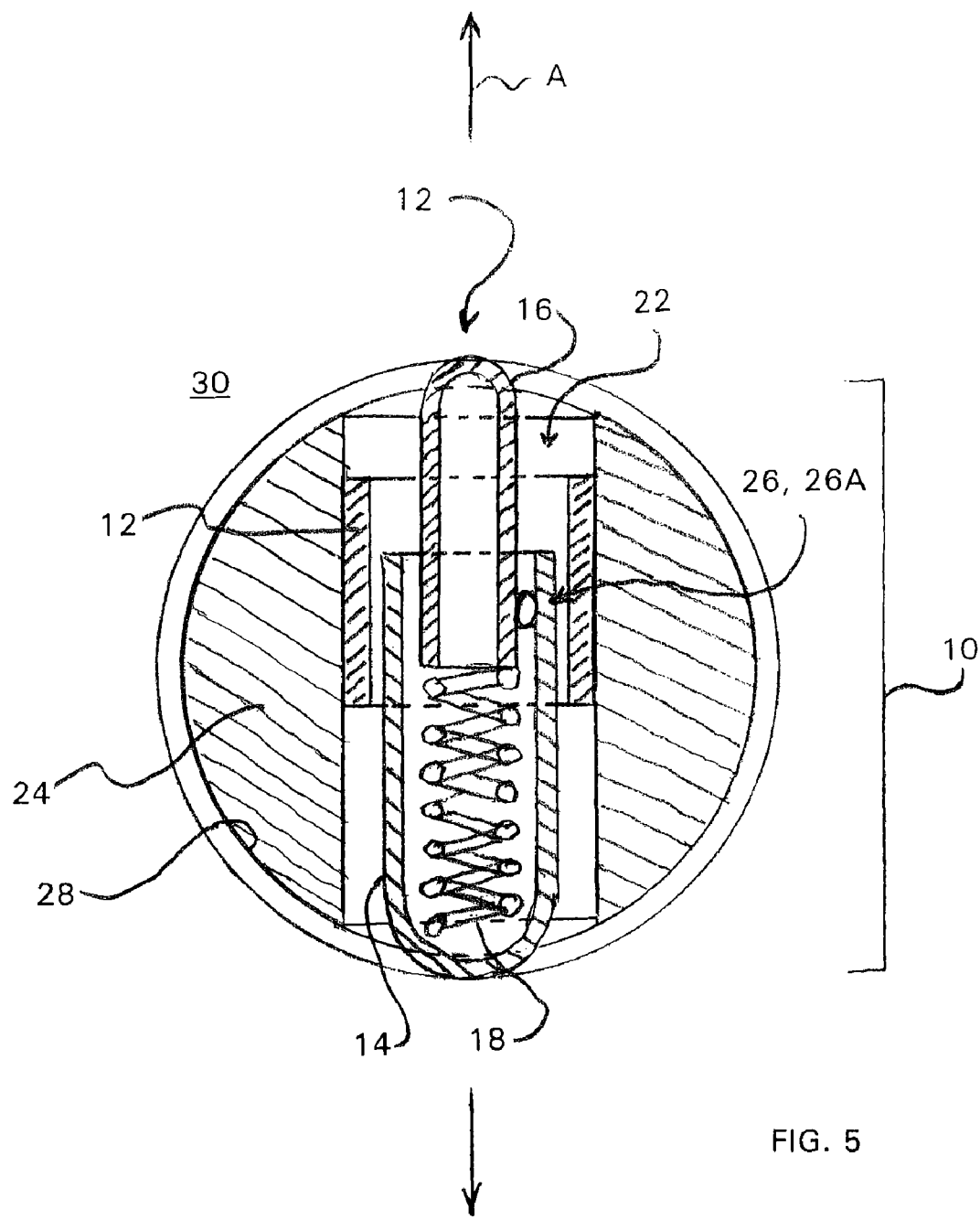
FIG. 5 is a diagrammatic cross section view of the expandible gauge and gauge adapter in a tool hole of a bore bar in a bore when expanded to measure the bore.

Referring to FIGS. 1 and 5, a minimum clearance bore gauge 10 of the present invention includes an expandible gauge 12 that, in turn, includes a gauge body 14, a gauge plunger 16 and an internal compression or expansion spring 18. As illustrated, the gauge body 14 is hollow and receives and contains the expansion spring 18 therein. In addition, a first end 16A of the gauge plunger 16 is also received by and partially within the first end 14A of the gauge body 14. The opposed outer ends 14B and 16B of the gauge body 14 and the gauge plunger 16 each terminate, for example, as a rounded tip in which the radii of outer ends 14B and 16B of the gauge body 14 and the gauge plunger 16 are both less than the radius of the bore to be measured. This insures that the inner surface of the bore to be measured will be contacted only by a surface of the opposed outer end which lies along a longitudinal centerline of the expandible gauge 12, thereby avoiding possible measurement errors due to ends 14B and 16B bridging a chord of the bore diameter and resulting in a measurement that is possibly less than the full diameter of the bore to be measured.

Also according to the present invention, the maximum diameters of both the gauge plunger 16 and the expansion spring 18 are less than the inner diameter of the gauge body 14 so that the gauge plunger 16 is allowed to slide freely within and relative to the gauge body 14 and the expansion spring 18 is allowed to compress and decompress within the gauge body 14 during such corresponding sliding movement of the gauge plunger 16. The exterior diameter of gauge plunger 16 is, however, sufficiently close to the inside diameter of gauge body 14 to prevent excessive side to side movement or axial tilting of the gauge plunger 16 relative to the gauge body 14, thereby insuring that the gauge body 14 and the gauge body 16 both remain substantially aligned with one another along the longitudinal centerline or axis A of the expandible gauge 12.

As will be described further below, the distance or length between the outer end 14B of the gauge body 14 and the outer end 16B of the gauge plunger 16 correspond to and represent the interior diameter of the bore to be measured. As a result of this, by alignment of the longitudinal centerline or axis A of the expandible gauge 12, passing through the gauge body 14 and the gauge plunger 16, with a diameter of the bore to be measured, errors due to a "bent" scale measurement are normally necessarily prevented.

Figure 2:
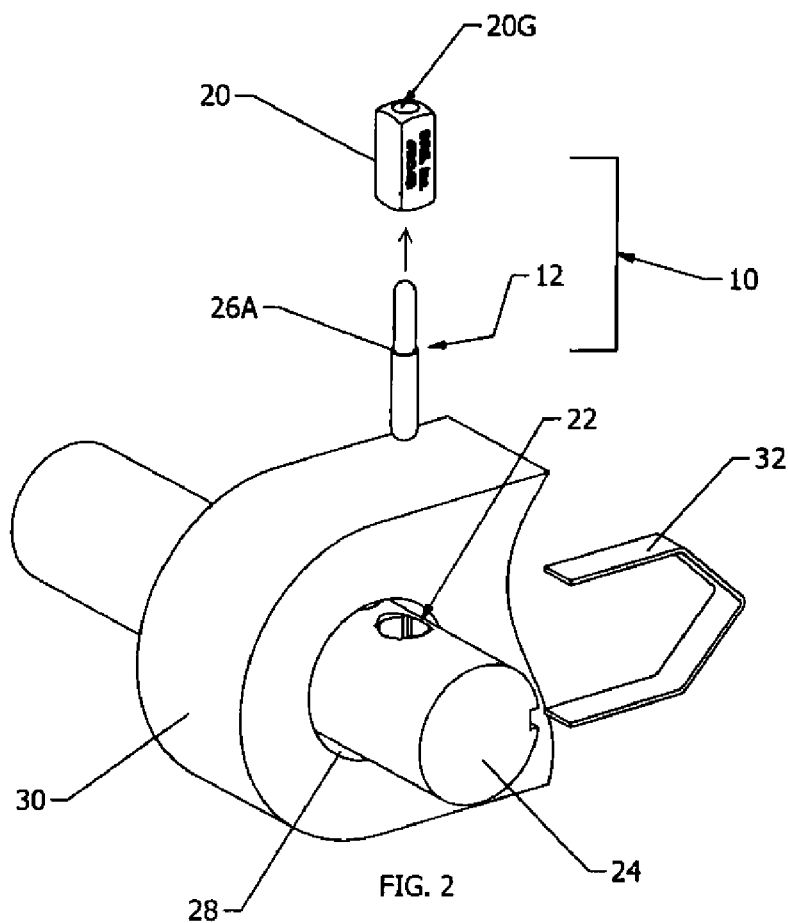
FIG. 2 is a diagrammatic representation of the assembly of an expandible gauge into a gauge adapter into a minimum bore gauge and the insertion of the assembled minimum bore gauge expandible into a gauge hole in a bore bar.

Referring next to FIGS. 2 and 5, a minimum clearance bore gauge 10 which, as illustrated therein, comprises the expandible gauge 12 and a gauge adapter 20, is inserted into a tool hole 22 in a bore bar 24. As shown, the gauge adapter 20 includes a central gauge hole 20G for receiving, with a close sliding fit, the expandible gauge 12 so that expandible gauge 12 may be slide into gauge adapter 20 but will be retained therein with its longitudinal axis aligned substantially with a longitudinal axis of the gauge hole 20G.

Tool hole 22 extends perpendicular to the longitudinal axis of bore bar 24 and the axis of tool hole 22 is coincident with a diameter of bore bar 24. The outer dimensions of the gauge adapter 20, which is illustrated as having a generally square cross section but may have a circular or a polygonal cross section, is such that the gauge adapter 20 has a close sliding fit within the tool hole 22. The central axis of gauge adapter 20 and thus the longitudinal axis of the expandible gauge 12 will thereby be coincident with the central axis of tool hole 22 and will be parallel to the longitudinal axis of the bore to be measured. In this regard, it should be noted that the rotational orientation of the expandible gauge 12, with respect to the bore to be measured, is typically not a source of error in the measurement of the bore. The dimensions of the expandible gauge 12, the gauge adapter 20 and the tool hole 22 must, however, be of sufficiently small clearance so that the expandible gauge 12 cannot assume an orientation that is tilted with respect to the longitudinal axis of the bore because such tilting of the expandible gauge 12, i.e., the expandible gauge 12 does not extend parallel to a diameter of the bore to be measured, could result in an erroneous measurement across a longitudinal diagonal of the bore.

Figure 4:
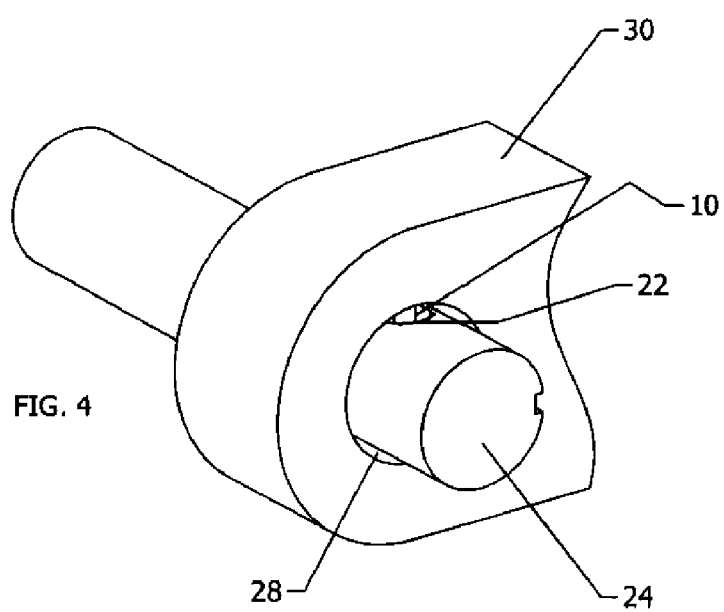

Referring now to FIGS. 3, 4 and 5 and considering the use of a minimum clearance bore gauge 10, the gauge body 14, the gauge plunger 16 and the expansion spring 18 are first assembled into the expandible gauge 12 and a drop of a high strength, fast drying glue or adhesive 26 is placed on the outer surface of gauge plunger 16 at an adhesive location 26A. As illustrated in FIG. 5, the adhesive location 26A is selected so that the drop of adhesive 26 will be properly positioned to adhesively secure an inwardly facing surface of the gauge body 14 to an outwardly facing surface of the gauge plunger 16, once the expansion spring 18 expands, so that the overall length of the expandible gauge 12 is equal to the interior diameter of the bore 28 to be measured. This insures that when the expandible gauge 12 is permitted to fully expand to the diameter of the bore to be measured, the drop of adhesive 26 will be located in a region of the overlap sidewalls of the gauge body 14 and the gauge plunger 16 to facilitate temporarily bonding of those two surfaces to one another. The drop of adhesive 26 will thereby be in contact with both the inwardly facing surface of the gauge body 14 and mating the outward facing surface of gauge plunger 16 and, as described below, will temporarily bond the gauge plunger 16 to the gauge body 14.

After the drop of adhesive 26 is applied to the adhesive location 26A, the expandible gauge 12 is then inserted into the central gauge hole 20G of the gauge adapter 20 and the assembly of the expandible gauge 12 and the gauge adapter 20 is then inserted into the tool hole 22 in the bore bar 24. Next, the bore bar 24 is moved or slid into the bore 28 of the desired machine or equipment 30 being repaired so that tool hole 22 is locate within the bore being repaired 28. Once in this position, the expansion spring 18 can then resiliently bias and move the gauge body 14 and the gauge plunger 16, relative to one another, along the longitudinal axis of the expandable gauge 12 until outer opposed ends 14B and 16B of the gauge body 14 and the gauge plunger 16 each contact and abut against an inwardly facing surface of bore being repaired 28, at diametrically opposed points within the bore. The distance between opposed outer ends 14B and 16B of the gauge body 14 and the gauge prove 16 will therefore be equivalent to the interior diameter of the bore being repaired 28.

The bore bar 24 carrying the expandable gauge 12 is then maintained in this position for a sufficient duration of time, e.g., between about 5 seconds to about ten minutes and more preferably about 15 seconds to about three 3 minutes, until the drop of adhesive 26 adequately dries, hardens, cures and/or bonds the gauge plunger 16 to the gauge body 14 and securely affixes the spacing of the gauge body 14 relative to the gauge plunger 16 so that the spacing between of the opposed outer ends 14B and 16B of the expandable gauge 12 are equal to the interior diameter of bore being repaired 28.

Once the drop of adhesive 26 has sufficiently dried, hardened, cured and/or bonded, the bore bar 24 is withdrawn from bore 28 by a distance sufficient to allow the removal of the expandable gauge 12 and the gauge adapter 20 from the tool hole 22. Following removal of expandable gauge 12, the operator then measures the length of expandable gauge 12, i.e., spacing between of the opposed outer ends 14B and 16B of the expandable gauge 12, with a micrometer or some other suitable measuring device, for example, to determine the interior diameter of the bore being repaired 28.

Once the measurement is obtained, the expandable gauge 12 may thereafter be properly discarded or preferably, since the expandable gauge 12 is intended to be reusable, the entire expandable gauge 12 is placed or submerged within a bath of a suitable solvent, depending upon the type of adhesive being utilized. The solvent will softer and/or dissolve the cured or harden drop of adhesive 26 so that adhesive is, or can be, removed and thereafter the gauge plunger 16 is again allowed to slide freely within and relative to the gauge body 14 to facilitate reuse of spacing between of the opposed outer ends 14B and 16B of the expandable gauge 12. The presently claimed invention covers both reuse of and disposal of the expandable gauge 12.

Finally, it will be noted that in some circumstances it may be difficult or awkward to restrain expandable gauge 12 from expanding while inserting the bore bar 24 into the bore to be repaired 28 to a location where the tool hole 22 is sufficiently located within the bore 28, such as when the measurement is being taken by a single operator. In such instance, a C-clip 32, an example of which is illustrated in FIGS. 2 and 6, may be slid over the bore bar 24 and the ends of tool hole 22 and engage and sandwich the opposed outer ends 14B and 16B of the expandable gauge 12 so as to restrain expandable gauge 12 in a partially compressed state (see FIG. 6, for example). As illustrated, the distance between the inwardly facing end surfaces of C-clip 32 is greater than the bore bar 24 but less than the interior diameter of the bore to be repaired 28. Normally the spacing of the inwardly facing end surfaces of C-clip 32 is typically approximately to the outer diameter of the bore bar 24. C-clip 32 will thereby restrain expandable gauge 12 in the partially compressed state until the bore bar 24 is slid into the bore to be repaired 28 sufficiently far enough so that the tool hole 22 and the expandable gauge 12 begin to enter the bore to be repaired 28. At this point, the C-clip 32 may either be removed by the operator or user or the C-clip 32 will simply become disengaged from the expandable gauge 12 and/or the bore bar 24 but abutting against a surface of the machine or the equipment structure 30 surrounding the bore to be repaired 28, thereby releasing the expandable gauge 12 so that the gauge can thereafter freely expand to match the diameter of the bore to be repaired 28, as described above.

It is to be appreciated that for small or larger size bores to be repaired 28, the overall size and/or dimensions of the gauge body 14, the gauge plunger 16 and the internal compression or expansion spring 18 will vary. But for all embodiments, the gauge body 14 and the gauge plunger 16 must be freely movable, relative to one another, as described above to provide an accurate measurement of the bore to be measured. The gauge body 14 typically has a length of between about 0.5 inch and about two feet and a diameter or width dimension of between about $\frac{1}{8}$ of inch and about 1 inch, the gauge plunger 16 typically has a length of between about 0.25 of an inch and about twenty four inches and a diameter or width dimension of between about $\frac{3}{32}$ and about $\frac{15}{16}$ on an inches, and the internal compression or expansion spring 18 typically has a length of between about $\frac{1}{4}$ and about six inches.

Lastly, the bore gauge 10, the gauge body 14, the gauge plunger 16 and the gauge adapter 20 are each typically manufactured from metal, plastic material, a phenolic, or any other machinable or moldable material, and the expansion spring 18 is typically manufactured from a metal or a plastic material. Suitable adhesives, for use with the present invention, are either a 410 or a 480 fast drying super strength adhesive manufactured by Loctite Corporation (e.g., LOCTITE® PRISM 410 Black Toughened Instant Adhesive or LOCTITE® PRISM 480 Black Toughened Instant Adhesive) or some other conventional fast drying super strength adhesive, for example, and a suitable solvent is, for example, acetone or possibly a lacquer based thinner.

The clearance or spacing between the exterior surface of the gauge plunger 16 and the inwardly facing surface of the gauge body 14 is such that the gauge body 14 permits substantially free relative sliding movement of the gauge plunger 16 while restricting such sliding movement substantially only along the longitudinal centerline or axis A of the expandable gauge 12. A clearance of between about 0.001 of an inch to about 0.030 of an inch between the exterior surface of the gauge plunger 16 and the inwardly facing surface of the gauge body 14, generally permits such movement.

A clearance or spacing between the exterior surface of the gauge adapter 20 and the inwardly facing surface of the tool hole 22 is such that the gauge adapter 20 is temporarily retained within the tool hole 22 along the longitudinal centerline or axis A of the expandable gauge 12. A clearance of between about 0.001 of an inch to about 0.030, between the exterior surface of the gauge adapter 20 and the inwardly facing surface of the tool hole 22, generally permits such retention.

It is to be appreciated that either the gauge body 14 and/or the gauge plunger 16 can have an extension attached thereto for increasing the length of the bore gauge 10 for larger diameter bores.

As is well known in the art, the tool hole 22 in the bore bar 24 can have a variety of different sizes, etc., be either a $\frac{3}{8}$", a $\frac{1}{2}$", a 10 mm or a 12 mm square hole or a 16 mm round hole. Since the gauge adapter 20 is designed to be inserted into and retained within the tool hole 22, the gauge adapter 20 normally has corresponding size so that the gauge adapter 20 can be easily and securely accommodated within the tool hole 22. Alternatively, the expandable gauge 12 and the gauge adapter 20 may be combined with one another to form a single combined gauge adapter component which is has an exterior shape and size which is suitably sized to be easily and securely accommodated within the tool hole 22 of the bore bar 24, i.e., the exterior shape and size of the combined gauge adapter component has a close sliding fit within the tool hole 22.

Since certain changes may be made in the above described method and system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of measuring an interior diameter of a bore, the method comprising the steps of:
   placing a predetermined quantity of a quick setting adhesive on a first component of an expandable gauge at a location that will still overlap with a second component of the expandable gauge when outer ends of the first and the second components of the expandable gauge are moved apart by a distance corresponding to a diameter of a bore to be measured;
   inserting the expandable gauge into a tool hole in a bore bar;
   using a C-clip to retain the expandable gauge within a partially compressed state prior to inserting the expandible gauge within the bore to be measured;
   removing the C-clip prior to sliding the bore bar into the bore so that the tool hole and the expandable gauge are located within the bore to be measured;
   allowing the expandable gauge to expand so that the outer ends of the first and the second components of the expandible gauge are moved apart by a distance corresponding to a diameter of the bore to be measured;
   allowing the quick setting adhesive to bond the first and the second components of the expandable gauge to one another;
   sliding the bore bar out of the bore until the expandable gauge can be removed from the tool hole; and
   determining the diameter of the bore by measuring the distance between the outer ends of the first and the second components of the expandable gauge.

2. The method of measuring the interior diameter of the bore according to claim 1, further comprising the step of:
   inserting the expandable gauge into a gauge adapter having an interior dimension for receiving the expandable gauge and an exterior dimension which is slidably insertable into the tool hole.

3. The method of measuring the interior diameter of the bore according to claim 2, further comprising the step of forming a central gauge hole in the gauge adapter for receiving, with a sliding fit, the expandable gauge such that a longitudinal axis of the gauge adapter is substantially aligned with a longitudinal axis of the gauge hole.

4. The method of measuring the interior diameter of the bore according to claim 2, further comprising the step of forming an exterior surface of the gauge adapter and an inwardly facing surface of the tool holder to have a clearance therebetween of about 0.001 of an inch to about 0.030 of an inch so as to temporarily retain the gauge adapter within the tool hole along the longitudinal centerline or an axis A of the expandable gauge.

5. The method of measuring the interior diameter of the bore according to claim 1, further comprising the step of:
   releasing the bonding of the first and the second components of the expandable gauge by applying a solvent to the quick setting adhesive.

6. The method of measuring the interior diameter of the bore according to claim 5, further comprising the step of:
   reusing the expandable gauge, following removal of the bond between the first and the second components of the expandable gauge, to determine a diameter of another bore.

7. The method of measuring the interior diameter of the bore according to claim 1, further comprising the step of:
   discarding the expandable gauge once the diameter of the bore is determined.

8. The method of measuring the interior diameter of the bore according to claim 1, further comprising the step of using a gauge plunger as the first component and using a gauge body as the second component and biasing the gauge body and the gauge plunger away from one another by a spring.

9. The method of measuring the interior diameter of the bore according to claim 8, further comprising the step of forming an inner diameter of the gauge body so that the gauge plunger is allowed to slide freely therein and the spring is allowed to compress and decompress within the gauge body during such corresponding sliding movement of the gauge plunger.

10. The method of measuring the interior diameter of the bore according to claim 9, further comprising the step of applying the quick setting adhesive on one of an inwardly facing surface of the gauge body and an outwardly facing surface of the gauge plunger.

11. The method of measuring the interior diameter of the bore according to claim 8, further comprising the step of forming an exterior surface of the gauge plunger and an inwardly facing surface of the gauge body to have a clearance therebetween of about 0.001 of an inch to about 0.030 of an inch so as to permit substantially free relative sliding movement of the gauge plunger while restricting such sliding movement substantially only along a longitudinal axis of the expandable gauge.

12. The method of measuring the interior diameter of the bore according to claim 1, further comprising the step of allowing the quick setting adhesive to bond the first and the second components of the expandable gauge to one another for a period of time of between about 5 seconds to about ten minutes.

13. The method of measuring the interior diameter of the bore according to claim 1, further comprising the steps of:
   forming the gauge body to have a length of between about 0.5 inch and about two feet and a width dimension of between about 1/8 of inch and about 1 inch; and
   forming the gauge plunger to have a length of between about 0.25 of an inch and about twenty four inches and a width dimension of between about 3/32 and about 15/16 on an inches.

14. The method of measuring the interior diameter of the bore according to claim 13, further comprising the step of forming the spring to have a length of between about 1/4 and about six inches.

15. A method of measuring an interior diameter of a bore by using an expandable gauge a consisting of a gauge body and a gauge plunger with a spring located therebetween for biasing the gauge body and the gauge plunger away from one another, and the gauge body partially overlapping the gauge plunger, the method comprising the steps of:
   placing a quick setting adhesive on at least one of the gauge body and the gauge plunger so that the quick setting adhesive can temporarily bond the gauge body and the gauge plunger to one another with the quick setting adhesive setting in about 5 seconds to about ten minutes and preventing, once the quick setting adhesive sets, relatively movement of the gauge plunger and the gauge body with respect to one another;

inserting the expandible gauge into a tool hole in a bore bar;

using a C-clip to retain the expandible gauge within a partially compressed state prior to inserting the expandible gauge within the bore to be measured;

removing the C-clip prior to sliding the bore bar into the bore so that the tool hole and the expandible gauge are located within the bore;

allowing the expandible gauge to expand to a diameter of the bore to be measured;

allowing the quick setting adhesive to bond the overlapped portion of the gauge body and the gauge plunger of the expandible gauge to one another;

removing the expandible gauge; and measuring a length of the expandible gauge to determine the diameter of the bore.

16. The method of measuring the interior diameter of the bore according to claim 15, further comprising the steps of:

inserting the expandible gauge into a gauge adapter having an interior dimension for receiving the expandible gauge and an exterior dimension which is slidably insertable into the tool hole; and forming an exterior surface of the gauge plunger and an inwardly facing surface of the gauge body to have a clearance therebetween of about 0.001 of an inch to about 0.030 of an inch so as to permit substantially free relative sliding movement of the gauge plunger while restricting such sliding movement substantially only along a longitudinal axis of the expandible gauge.

17. The method of measuring the interior diameter of the bore according to claim 16, further comprising the steps of forming the gauge body to have a length of between about 0.5 inch and about two feet and a width dimension of between about ⅛ of inch and about 1 inch;

forming the gauge plunger to have a length of between about 0.25 of an inch and about twenty four inches and a width dimension of between about 3/32 and about 15/16 on an inches; and forming the spring to have a length of between about ¼ and about six inches.

* * * * *